United States Patent
Lee et al.

(10) Patent No.: US 7,884,164 B2
(45) Date of Patent: Feb. 8, 2011

(54) CATALYST SYSTEM FOR OLEFIN POLYMERIZATION COMPRISING TRIOXASILOCANE AND METHOD FOR OLEFIN POLYMERIZATION USING THE SAME

(75) Inventors: Nan-Young Lee, Daejeon Metropolitan (KR); Churl-Young Park, Daejeon Metropolitan (KR); Dong-Ryul Im, Daejeon Metropolitan (KR); Jin-Woo Lee, Daejeon Metropolitan (KR); Ro-Mi Lee, Chungcheongnam-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/524,908

(22) PCT Filed: Jan. 21, 2008

(86) PCT No.: PCT/KR2008/000367

§ 371 (c)(1),
(2), (4) Date: Jul. 29, 2009

(87) PCT Pub. No.: WO2008/093953

PCT Pub. Date: Aug. 7, 2008

(65) Prior Publication Data

US 2010/0036067 A1      Feb. 11, 2010

(30) Foreign Application Priority Data

Jan. 30, 2007   (KR) .................... 10-2007-0009333

(51) Int. Cl.
*C08F 4/52* (2006.01)
(52) U.S. Cl. .................................. 526/125.3
(58) Field of Classification Search ............... 526/125.3
See application file for complete search history.

(56) References Cited

U.S. PATENT DOCUMENTS

| | | | |
|---|---|---|---|
| 4,180,636 A | 12/1979 | Hirota et al. | |
| 4,242,479 A | 12/1980 | Yokota et al. | |
| 4,347,160 A | 8/1982 | Epstein et al. | |
| 4,382,019 A | 5/1983 | Greco | |
| 4,435,550 A | 3/1984 | Ueno et al. | |
| 4,442,276 A | 4/1984 | Kashiwa et al. | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,560,671 A | 12/1985 | Gross et al. | |
| 4,581,342 A | 4/1986 | Johnson et al. | |
| 4,657,882 A | 4/1987 | Karayannis et al. | |
| 4,784,983 A | 11/1988 | Mao et al. | |
| 4,829,038 A | 5/1989 | Hoppin et al. | |
| 4,861,847 A | 8/1989 | Mao et al. | |
| 4,990,479 A | 2/1991 | Ishimaru et al. | |
| 5,438,110 A | 8/1995 | Ishimaru et al. | |
| 5,891,817 A * | 4/1999 | Shamshoum et al. | ........ 502/127 |
| 7,141,635 B2 | 11/2006 | Chen et al. | |

FOREIGN PATENT DOCUMENTS

| | | |
|---|---|---|
| EP | 0045976 A2 | 2/1982 |
| EP | 0045977 A2 | 2/1982 |
| KR | 20050013131 | 2/2005 |
| KR | 20080017585 A | 2/2008 |
| WO | 95/21203 A1 | 8/1995 |

OTHER PUBLICATIONS

Brodskaya et al., Russian Journal of General Chemistry, 67(5); 717-728 (1997).
Oddon et al., Terrahedron Letters, 34(46); 7413-7416 (1993).
Von Antronio Fronda et al., Agnew Chem. 101, 1750-1752 (1989). (English description cited in search report).
International Search Report, PCT/KR2008/000367.

* cited by examiner

*Primary Examiner*—Ling-Siu Choi
*Assistant Examiner*—Sonya Wright
(74) *Attorney, Agent, or Firm*—Lerner, David, Littenberg, Krumholz & Mentlik, LLP

(57) ABSTRACT

The present invention relates to a catalyst system for olefin polymerization and a method for olefin polymerization using the same. More particularly, the present invention relates to a Ziegler-Natta catalyst system for olefin polymerization comprising a transition metal compound as a main catalyst component, an organic metal compound as a cocatalyst component, and a cyclic organosilane compound, trioxasilocane as an external electron donor, and a method for olefin polymerization using the same. According to the present invention, a polyolefin having improved various properties such as polymerization activity, melt-flow ability, isotacticity, molecular weight distribution and apparent density can be produced.

19 Claims, No Drawings

CATALYST SYSTEM FOR OLEFIN POLYMERIZATION COMPRISING TRIOXASILOCANE AND METHOD FOR OLEFIN POLYMERIZATION USING THE SAME

CROSS REFERENCE TO RELATED APPLICATIONS

The present application is a national phase entry under 35 U.S.C. §371 of International Application No. PCT/KR2008/000367, filed Jan. 21, 2008, which claims the benefit of Korean Patent Application No. 10-2007-0009333, filed Jan. 30, 2007. The disclosures of said applications are incorporated by reference herein.

TECHNICAL FIELD

The present invention relates to a catalyst system for olefin polymerization and a method for olefin polymerization using the same. More particularly, the present invention relates to a Ziegler-Natta catalyst system for olefin polymerization comprising a transition metal compound as a main catalyst component, an organic metal compound as a cocatalyst component, and a cyclic organosilane compound, trioxasilocane as an external electron donor, and a method for olefin polymerization using the same.

This application claims priority from Korean Patent Application No. 10-2007-0009333 filed on Jan. 30, 2007 in the KIPO, the disclosure of which is incorporated herein by reference in its entirety.

BACKGROUND ART

It has been known that a polyolefin is generally obtained by polymerizing olefin monomers such as ethylene and propylene using a Ziegler-Natta catalyst system containing a transition metal halide as a main catalyst component.

Ziegler-Natta catalyst systems having various characteristics have been recently known, and polyolefins produced by using the various Ziegler-Natta catalyst systems may exhibit diverse properties in terms of stereoregularity, molecular weight distribution, impact strength, melt-flow ability, rigidity, heat seal ability, isotacticity, or the like.

Meanwhile, organosilane compounds have been used in the Ziegler-Natta catalyst system as an internal electron donor upon producing a solid main catalyst component comprising a halogen-containing titanium compound supported on an activated magnesium dihalide compound or as an external electron donor introduced into a reactor in combination with a solid main catalyst component and aluminum-alkyl cocatalyst upon polymerization. Typically, the organosilane compounds used in the Ziegler-Natta catalyst system have Si—OR, Si—OCOR or Si—NR$_2$ group (herein, R is alkyl having 1 to 20 carbon atoms, alkenyl, aryl, arylalkyl or cycloalkyl). Such organosilane compounds are described in U.S. Pat. Nos. 4,180,636, 4,242,479, 4,347,160, 4,382,019, 4,435,550, 4,442,276, 4,473,660, 4,530,912, and 4,560,671, in which they are used as internal electron donors, and in U.S. Pat. Nos. 4,472,524, 4,522,930, 4,560,671, 4,581,342, 4,657,882 and European patent application Nos. 45976 and 45977, in which they are used as external electron donors.

In particular, U.S. Pat. Nos. 4,784,983 and 4,861,847 disclose a catalyst system for use in olefin polymerization and copolymerization, consisting of (A) a solid product consisting essentially of titanium, magnesium, halogen, polycarboxylic acid esters and organic phosphorus compounds, (B) an organic aluminum compound, and (C) an organic silane compound; U.S. Pat. Nos. 4,990,479 and 5,438,110 disclose a catalyst system for olefin polymerization formed from (A) a solid titanium catalyst component containing magnesium, titanium and halogen as essential ingredients, (B) an organoaluminum compound, and (C) an organosilicon compound containing a cyclopentyl group, a cyclopentenyl group, a cyclopentadienyl group or a derivative derived from any of these groups; and U.S. Pat. No. 4,829,038 discloses a catalyst system for olefin polymerization comprising a solid, hydrocarbon-insoluble, magnesium-containing, titanium-containing, electron donor-containing component, an alkyl aluminum compound, and organosilane compound selected from the group consisting of diisobutyldimethoxysilane, diisopropyldimethoxysilane, t-butyltrimethoxysilane, di-t-butyldimethoxysilane, and mixtures thereof.

Further, Korean Patent Application No. 10-2005-0013131 discloses a Ziegler-Natta catalyst system for olefin polymerization to improve polymer properties using organosilicon compounds such as dicyclopentyldimethoxysilane, propyltriethoxysilane, and methylcyclohexyldimethoxysilane as a selectivity control agent (SCA). WO 95/21203 recognizes dominating behavior for SCA's, when used together in a single reaction step at molar ratios of SCA:transition metal of 33:1.

Korean Patent Application No. 10-2006-0078834 discloses a catalyst system for olefin polymerization to improve melt-flowability by mixing organosilicon compounds such as dicyclopentyldimethoxysilane and trioxasilocane, but there is a problem in that the catalytic activity is reduced.

If organosilane compounds are contained in the Ziegler-Natta catalyst system as an electron donor for the polymerization of olefin monomers having 3 or more carbon atoms such as propylene, an increase in the isotacticity of the resulting polymer is promoted. However, if upon Ziegler-Natta polymerization, organosilane compounds are used to promote an increase in the isotacticity of polyolefin, other characteristics including catalytic activity tend to reduce. Therefore, there is a need to develop a Ziegler-Natta catalyst system capable of improving various characteristics as well as utilizing organosilane compounds, and a related method.

DISCLOSURE OF INVENTION

Technical Problem

In order to solve the above described problems, an object of the present invention is to provide a catalyst system for olefin polymerization which is capable of improving various characteristics such as polymerization activity, melt-flow ability, isotacticity, molecular weight distribution and apparent density, and a method for olefin polymerization using the same.

Technical Solution

The present invention provides a catalyst system for olefin polymerization, comprising (a) a transition metal compound containing an element of Groups IV, V or VI of the periodic table as a solid main catalyst component; (b) an organic metal compound containing an element of Group XIII of the periodic table as a cocatalyst component; and (c) an organosilane compound represented by the following Formula 1 as an external electron donor.

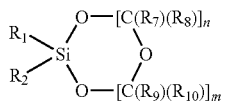

[Formula 1]

wherein $R_1$ and $R_2$ are each independently hydrogen, an alkyl group having 1 to 20 carbon atoms, an alkenyl group having 2 to 20 carbon atoms, an alkoxy group having 1 to 20 carbon atoms, or a cycloalkyl group having 5 to 30 carbon atoms, and at least one of $R_1$ and $R_2$ is a branched alkyl group having 1 to 20 carbon atoms;

$R_7$, $R_8$, $R_9$, and $R_{10}$ are each independently hydrogen, an alkyl group having 1 to 20 carbon atoms, an alkenyl group having 2 to 20 carbon atoms, an alkoxy group having 1 to 20 carbon atoms, or a cycloalkyl group having 5 to 30 carbon atoms; and n and m are each independently an integer of 1 to 3.

According to an embodiment of the present invention, a catalyst system further comprising an organosilane compound represented by the following Formula 2 as the external electron donor (c) is provided.

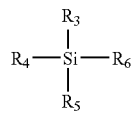

[Formula 2]

wherein $R_3$, $R_4$, $R_5$ and $R_6$ represent each independently hydrogen; an alkyl group having 1 to 20 carbon atoms; an alkenyl group having 2 to 20 carbon atoms; an alkoxy group having 1 to 20 carbon atoms; or a cycloalkyl group having 5 to 30 carbon atoms.

In Formulae 1 and 2, "alkyl group" includes straight and branched alkyl groups, and has 1 to 20 carbon atoms, preferably 1 to 10 carbon atoms, and more preferably 1 to 5 carbon atoms. Examples of the alkyl group include a methyl group, an ethyl group, and a propyl group, but are not limited thereto. At least one hydrogen atom contained in the alkyl group may be substituted with a hydroxyl group, a halogen atom, a carboxyl group, a nitro group, an amine group, a cyano group or the like.

In Formulae 1 and 2, "alkenyl group" includes straight and branched alkenyl groups, and has 2 to 20 carbon atoms, preferably 2 to 10 carbon atoms, and more preferably 2 to 5 carbon atoms. Examples of the alkenyl group include vinyl group and propenyl group, but are not limited thereto. At least one hydrogen atom contained in the alkenyl group may be substituted with a hydroxyl group, a halogen atom, a carboxyl group, a nitro group, an amine group, a cyano group or the like.

Further, in Formulae 1 and 2, "alkoxy group" is a substituent, in which —O— is connected to the end of the alkyl group, like —O-alkyl, and includes straight and branched alkoxy groups. The alkoxy group has 1 to 20 carbon atoms, preferably 1 to 10 carbon atoms, and more preferably 1 to 5 carbon atoms. Examples of the alkoxy group include a methoxy group and an ethoxy group, but are not limited thereto. At least one hydrogen atom contained in the alkoxy group may be substituted with a hydroxyl group, a halogen atom, a carboxyl group, a nitro group, an amine group, a cyano group or the like.

Further, in Formulae 1 and 2, "cycloalkyl group" is a saturated cyclic alkyl group not containing a double bond. Examples of the cycloalkyl group include a cyclopentyl group and a cyclohexyl group, and at least one hydrogen atom contained in the cycloalkyl group may be substituted with a hydroxyl group, a halogen atom, a carboxyl group, a nitro group, an amine group, a cyano group or the like.

The cyclic organosilane compound represented by Formula 1 is referred to as "trioxasilocane compound" in the present specification.

According to an embodiment of the present invention, a catalyst system for olefin polymerization is characterized in that both $R_1$ and $R_2$ of the organosilane compound represented by Formula 1 are branched alkyl groups having 1 to 20 carbon atoms.

According to an embodiment of the present invention, a catalyst system is provided, in which the organosilane compound represented by Formula 1 is an organosilane compound represented by the following Formula 3.

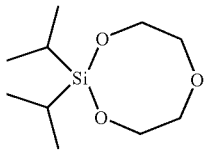

[Formula 3]

According to an embodiment of the present invention, a catalyst system is provided, in which at least one of $R_3$, $R_4$, $R_5$ and $R_6$ in Formula 2 is an alkoxy group having 1 to 20 carbon atoms.

According to an embodiment of the present invention, a catalyst system is provided, in which at least one of $R_3$, $R_4$, $R_5$ and $R_6$ in Formula 2 is a cycloalkyl group having 5 to 30 carbon atoms.

According to an embodiment of the present invention, a catalyst system is provided, in which the organosilane compound represented by Formula 2 is an organosilane compound represented by the following Formula 4.

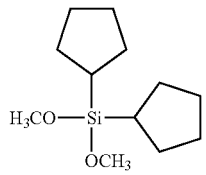

[Formula 4]

According to an embodiment of the present invention, a catalyst system is provided, in which a molar ratio of the organosilane compound represented by Formula 2 to the organosilane compound represented by Formula 1 is 0.1 to 10.

According to an embodiment of the present invention, a catalyst system is provided, in which the transition metal compound (a) is a solid titanium compound containing magnesium, titanium, halogen elements, and an internal electron donor.

According to an embodiment of the present invention, a catalyst system is provided, in which the internal electron donor contained in the transition metal compound (a) is a diether-based compound, a phthalate-based compound, and a mixture thereof.

According to an embodiment of the present invention, a catalyst system is provided, in which the organic metal compound (b) is an organoaluminum compound.

According to an embodiment of the present invention, a catalyst system is provided, in which the organic metal compound (b) is selected from the group consisting of trialkylaluminum, dialkyl aluminum halide, alkyl aluminum dihalide, dialkyl aluminum hydride, alkyl aluminum sesquihalide, and mixtures thereof.

According to an embodiment of the present invention, a catalyst system is provided, in which the organic metal compound (b) is selected from the group consisting of $Al(C_2H_5)_3$, $Al(C_2H_5)_2H$, $Al(C_3H_7)_3$, $Al(C_3H_7)_2H$, $Al(C_4H_9)_2H$, $Al(i-C_4H_9)_2H$, $Al(i-C_4H_9)_3$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(C_{18}H_{37})_2$, $(i-C_4H_9)$, $C_2H_5)_2AlCl$, $(i-C_3H_9)_2AlCl$, $Al(C_{16}H_{33})_3$, $(C_2H_5)_3Al_2Cl_3$, and mixtures thereof. According to an embodiment of the present invention, a catalyst system is provided, in which the organic metal compound (b) is selected from the group consisting of a mixture of $Al(C_2H_5)_3$ and $Al(i-C_4H_9)_3$; a mixture of $Al(C_2H_5)_3$ and $Al(C_8H_{17})_3$; a mixture of $Al(C_4H_9)_2H$ and $Al(C_8H_{17})_3$; a mixture of $Al(i-C_4H_9)_3$ and $Al(C_8H_{17})_3$; a mixture of $Al(C_2H_5)_3$ and $Al(C_{12}H_{25})_3$; a mixture of $Al(i-C_4H_9)_3$ and $Al(C_{12}H_{25})_3$; a mixture of $Al(C_2H_5)_3$ and $Al(C_{16}H_{33})_3$; and a mixture of $Al(C_3H_7)_3$ and $Al(C_{18}H_{37})_2(i-C_4H_9)$.

According to an embodiment of the present invention, a catalyst system is provided, in which a molar ratio of the organic metal compound (b) to the transition metal compound (a) is 5 to 800.

According to an embodiment of the present invention, a catalyst system is provided, in which a molar ratio of the external electron donor (c) to the transition metal compound (a) is 1 to 150.

Further, the present invention provides a method for olefin polymerization using the catalyst system for olefin polymerization.

According to an embodiment of the present invention, a method for olefin polymerization is provided, in which the olefin is ethylene or alpha-olefin.

According to an embodiment of the present invention, the alpha-olefin can be selected from the group consisting of propylene, 1-butene, 1-pentene, 1-hexene, or mixtures thereof.

According to an embodiment of the present invention, a method for olefin polymerization is provided, in which the olefin is introduced into a reactor at a feed rate of 0.002 to 100 g/gram of catalyst for polymerization/hour. The "feed rate of olefin into a reactor" used herein means the amount of olefin introduced into the reactor per hour with respect to gram of catalyst for polymerization being present in the reactor.

According to an embodiment of the present invention, a method for olefin polymerization is provided, in which the feed rate of olefin into a reactor is 0.02 to 10 g of olefin/gram of catalyst for polymerization/hour.

Further, the present invention provides a polyolefin produced by using the method for olefin polymerization.

ADVANTAGEOUS EFFECTS

In the case of using a catalyst system for olefin polymerization according to the present invention, a polyolefin having improved various properties such as polymerization activity, melt-flow ability, isotacticity, and molecular weight distribution can be produced.

BEST MODE FOR CARRYING OUT THE INVENTION

Hereinafter, the present invention will be described in detail.

The catalyst system for olefin polymerization according to the present invention comprises a transition metal compound containing an element of Groups IV, V or VI of the periodic table as a main catalyst component, an organic metal compound containing an element of Group XIII of the periodic table as a cocatalyst component, and an organosilane compound represented by Formula 1 or a mixture of an organosilane compound represented by Formula 1 and an organosilane compound represented by Formula 2 as an external electron donor.

The organosilane compound represented by Formula 1 functions as an external electron donor in the catalyst system for olefin polymerization according to the present invention, and contains a central silicon atom and three oxygen atoms, in which two oxygen atoms of them is directly connected to the central silicon atom to form a cyclic structure (Hereinbelow, referred to as cyclic trioxasilocane structure). The cyclic structure is preferably six or more-membered rings.

In the organosilane compound of Formula 1, it is preferable that n and m are each independently 1 or 2 in terms of stability of the cyclic trioxasilocane structure, and it is more preferable that both of n and m are 2.

Both $R_1$ and $R_2$ of organosilane compound represented by Formula 1 is preferably a branched alkyl group having 1 to 20 carbon atoms.

More preferred example thereof is the organosilane compound represented by Formula 3 (2,2-diisopropyl-1,3,6,2-trioxasilocane).

Meanwhile, the organosilane compound represented by Formula 2 is a silane compound, in which four substituents surrounding Si are present, and functions as an external electron donor in the catalyst system for olefin polymerization according to the present invention. Any organosilane compound that is generally used as an external electron donor in the catalyst system for olefin polymerization can be used, and preferably alkoxysilane compounds such as dicyclopentyldimethoxysilane, cyclohexylmethyldimethoxysilane and vinyltriethoxysilane. Preferred example of the organosilane compound represented by Formula 2 is an organosilane compound represented by Formula 4 (dicyclopentyldimethoxysilane).

In the case of using the organosilane compound represented by Formula 1 with the organosilane compound represented by Formula 2 as an external electron donor in the catalyst system for olefin polymerization according to the present invention, the molar ratio of the organosilane compound represented by Formula 2 to the organosilane compound represented by Formula 1 is preferably 0.1 to 10, and more preferably 1 to 5. In the case where the molar ratio of the organosilane compound represented by Formula 2 to the organosilane compound represented by Formula 1 is less than 0.1, there is a problem in that isotacticity is reduced. In the case where the molar ratio of the organosilane compound represented by Formula 2 to the organosilane compound represented by Formula 1 is more than 10, there is a problem in that its hydrogen reactivity decreases.

The catalyst system for olefin polymerization according to the present invention comprises a transition metal compound containing an element of Groups IV, V or VI of the periodic table as a solid main catalyst component (a), and preferably a solid titanium compound containing magnesium, titanium, halogen elements and an internal electron donor. As the titanium compound, a tetravalent titanium compound is preferable. Such transition metal compound for olefin polymerization and a production method thereof are known in the related art, and any known transition metal compound can be used without limitation in the range of achieving the object of the present invention.

As the internal electron donor contained in the transition metal compound (a) in the catalyst system for olefin polymerization according to the present invention, any internal electron donor that is conventionally used in the production of a solid main catalyst component for olefin polymerization can be used without limitation, and preferably a diether-based compound, a phthalate-based compound, or a mixture thereof. Examples of the diether-based compound include 2-n-propyl-2-cyclohexyl-1,3-dimethoxypropane and cyclopolyenic 1,3-diether, and examples of the phthalate-based compound include diethylphthalate, diisobutylphthalate, and dineopentylphthalate.

The catalyst system for olefin polymerization according to the present invention comprises an organic metal compound containing an element of Group XIII of the periodic table as a cocatalyst component (b), and comprises preferably an organoaluminum compound. The organoaluminum compound is preferably selected from the group consisting of trialkylaluminium, dialkylaluminiumhalide, alkylaluminiumdihalide, dialkylaluminiumhydride, alkylaluminium sesquihalide and mixtures thereof, and more preferably selected from the group consisting of $Al(C_2H_5)_3$, $Al(C_2H_5)_2H$, $Al(C_3H_7)_3$, $Al(C_3H_7)_2H$, $Al(C_4H_9)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $Al(C_{18}H_{37})_2(i-C_4H_9)$, $(C_2H_4)_2AlCl$, $(i-C_3H_9)_2AlCl$, $Al(C_{16}H_{33})_3$, $(C_2H_5)_3Al_2Cl_3$, and mixtures thereof. Further, as the cocatalyst component (b), a mixture of organoaluminum compounds can be used, in particular, a mixture of different organoaluminum compounds can be used. Specifically, the mixture of the organoaluminum compound can be selected from the group consisting of a mixture of $Al(C_2H_5)_3$ and $Al(i-C_4H_9)_3$; a mixture of $Al(C_2H_5)_3$ and $Al(C_8H_{17})_3$; a mixture of $Al(C_4H_9)_2H$ and $Al(C_8H_{17})_3$; a mixture of $Al(i-C_4H_9)_3$ and $Al(C_8H_{17})_3$; a mixture of $Al(C_2H_5)_3$ and $Al(C_{12}H_{25})_3$; a mixture of $Al(i-C_4H_9)_3$ and $Al(C_{12}H_{25})_3$; a mixture of $Al(C_2H_5)_3$ and $Al(C_{16}H_{33})_3$; and a mixture of $Al(C_3H_7)_3$ and $Al(C_{18}H_{37})_2(i-C_4H_9)$.

Further, as the cocatalyst component (b), a chlorine-free organoaluminum compound is preferably used. Suitable examples of the chlorine-free organoaluminum compound include trialkylaluminium or dialkylaluminium hydride having hydrocarbons having 1 to 16 carbon atoms, and preferably selected from the group consisting of $Al(C_2H_5)_3$, $Al(C_2H_5)_2H$, $Al(C_3H_7)_3$, $Al(C_3H_7)_2H$, $Al(i-C_4H_9)_3$, $Al(i-C_4H_9)_2H$, $Al(C_8H_{17})_3$, $Al(C_{12}H_{25})_3$, $Al(C_2H_5)(C_{12}H_{25})_2$, and $Al(i-C_4H_9)(C_{12}H_{25})_2$.

In the catalyst system for olefin polymerization according to the present invention, the molar ratio of the organic metal compound (b) to the transition metal compound (a) is preferably 5 to 800. In the case where the molar ratio is less than 5, there is a problem in that the active site of the catalyst is not activated. In the case where the molar ratio is more than 800, there is a problem in that titanium is over-reduced to decrease the activity.

In the catalyst system for olefin polymerization according to the present invention, the molar ratio of the external electron donor (c) to the transition metal compound (a) is preferably 1 to 150, and more preferably 30 to 100. In the case where the molar ratio is less than 1, there is a problem in that the isotacticity of the resulting polymer is reduced. In the case where the molar ratio is more than 150, there is a problem in that the catalytic activity is decreased.

Such catalyst system for olefin polymerization of the present invention can be used for general olefin polymerization, in particular, preferably used for ethylene or alpha-olefin polymerization. Examples of the alpha-olefin include propylene, 1-butene, 1-pentene, 1-hexene and mixtures thereof, and preferably propylene. The method for olefin polymerization according to the present invention comprises copolymerization of two or more types of olefin as well as homo polymerization of alpha-olefin. Therefore, in the method for olefin polymerization according to the present invention, for example, homo polymerization of propylene and copolymerization of propylene with 1-butene or 1-hexene can be performed.

The olefin polymerization using the catalyst system for olefin polymerization of the present invention can be performed according to a conventional polymerization process, and any polymerization process known in the art can be used without limitation.

In the polymerization process of olefin using the catalyst system according to the present invention, the feed rate of olefin into a reactor is preferably 0.002 to 100 g of olefin/gram of catalyst for polymerization/hour, and more preferably 0.02 to 10 g of olefin/gram of catalyst for polymerization/hour. In the case where the feed rate is less than 0.002 g of olefin/gram of catalyst for polymerization/hour, there is a problem in that the activity is reduced by not reaching to the time for maintaining the active site of the catalyst. In the case where the feed rate is more than 100 g of olefin/gram of catalyst for polymerization/hour, there is a problem in that an exergonic reaction can not be controlled to separate the active site of the catalyst from a support.

According to the method for olefin polymerization of the present invention, by using a catalyst system comprising a mixture of the organosilane compound represented by Formula 1 and the organosilane compound represented by Formula 2 as an external electron donor, a polyolefin having improved melt flow rate and isotacticity can be obtained while maintaining high catalytic activity.

MODE FOR THE INVENTION

Hereinafter, the present invention will be described in more detail with reference to Examples and Comparative Examples. However, the present invention is not intended to be limited by these Examples.

Properties of the polymers synthesized in the following Examples were measured by the methods described below.

(1) Polymerization Activity

The polymerization activity of the catalyst was calculated from the weight ratio of the produced polymer (kg) per the amount of the used catalyst (g catalyst) (Unit: kg PP/g catalyst).

(2) Melt Flow Rate (MFR)

The melt flow rate was measured in accordance with ASTM D1238 under the conditions of a temperature of 230° C. and a load of 2.16 kg, and represented by the weight (g) of the melted polymer extruded for 10 minutes (Unit: g/10 min).

(3) Apparent Density

The weight of polymer in a 100 ml vessel was measured using an IPT model 1132 (Unit: g/ml).

(4) Isotacticity

The isotacticity (%) of polymer is a weight ratio of polymer not extracted with boiling o-xylene for 1 hour (Unit: %). The measurement of isotacticity in the polymer will be described in detail as follows.

First, 200 ml of xylene was prepared in a flask, and filtered with a 200 mm filter paper (No. 4). An aluminum pan was dried in an oven at 150° C. for 30 minutes, and then cooled in a desicator to measure the mass. Next, 100 ml of the filtered o-xylene was transferred to the aluminum pan using a pipette, and heated to 145 to 150° C. to completely evaporate o-xylene. Then, the aluminum pan was dried under vacuum at a temperature of 100±5° C. and a pressure of 13.3 kPa for 1 hour. Subsequently, the aluminum pan was cooled in the desicator, and the above procedure was repeated twice to finish a blank test of o-xylene with a weight error of 0.0002 g.

Next, the polymer produced in Example was dried (70° C., 13.3 kPa, 60 min, under vacuum oven), and then 2 g±0.0001 g of the polymer sample cooled in the desicator was put in a 500 ml flask. 200 ml of o-xylene was added thereto. The flask was connected to nitrogen and cooling water, and heated for 1 hour to continuously reflux o-xylene. Then, the flask was left in the air for 5 minutes and cooled under 100° C. The flask was shaken, and put in a water bath (25±0.5° C.) for 30 minutes to precipitate the insoluble matter. The resulting solution having precipitates was filtered with a 200 mm filter paper (No. 4), and the procedure was repeated until the solution became clear. The solution was dried at 150° C. for 30 minutes, and then cooled in the desicator. 100 ml of the resulting solution that had been clearly filtered was placed on the aluminum pan that had already weighed. The aluminum pan was heated to 145 to 150° C. to evaporate o-xylene. After evaporation, the aluminum pan was dried under vacuum at a temperature of 70±5° C. and a pressure of 13.3 kP for 1 hour. The cooling step in the desicator was repeated twice, and its weight was measured with a weight error of 0.0002 g.

In accordance with the following Mathematical Formula, the percent by weight (XS) of the polymer solubilized in o-xylene was determined, and from this, the weight ratio (=100-XS) of the polymer not extracted with o-xylene was determined, which is defined as isotacticity and illustrated in the following Table 1.

$$XS = \left(\frac{Vbo}{Vb1} X(W2 - W1) - \frac{Vbo}{Vb2} XB\right) / Wo \times 100$$

XS=polymer solubilized in o-xylene, % by weight
Vbo=initial volume of o-xylene, ml (=200 ml)
Vb1=obtained volume of polymer solubilized in o-xylene, ml (=100 ml)
Vb2=obtained volume of o-xylene used upon blank test, ml (=100 ml)
W2=total weight of polymer that remains in aluminum pan after evaporation of aluminum pan and o-xylene, g
W1=weight of aluminum pan, g
Wo=initial weight of polymer, g (=2 g)
B=mean value of residual in aluminum pan upon blank test, g

Example 1

(1) Synthesis of Solid Main Catalyst for Olefin Polymerization 25.25 g of magnesium compound ($MgCl_2$) and 150 ml of anhydrous heptane were added to a 500 ml glass reactor at 0° C. under nitrogen atmosphere, and stirred. Then, 21.6 ml of 1 M phthalate compound (diisobutylphthalate) was added dropwise, and stirred for 10 minutes. Next, 100 ml of $TiCl_4$ at 0° C. was added thereto, and subjected to the reaction at room temperature for 1 hour. Then, 150 ml of $TiCl_4$ was further added dropwise, the temperature was raised to 100° C., and subjected to the reaction for 2 hours. After completing the reaction, $TiCl_4$ was removed. Then, the resultant was washed with heptane six times at 80° C., dried under vacuum at 40° C. and stored. 2.4% by weight of titanium atom was contained in the solid titanium main catalyst.

(2) Preparation of 2,2-diisopropyl-1,3,6,2-trioxasilocane

An organosilane compound (2,2-diisopropyl-1,3,6,2-trioxasilocane) having the structure of Formula 3 was prepared as follows.

Imidazole (1.70 g, 25 mmol, Aldrich) and dimethylformamide (30 ml, Aldrich) were put in a 500 ml round bottom flask, and stirred at room temperature for 5 minutes. Then, diethyleneglycol (1.59 g, 15 mmol, Aldrich) was added thereto, and further stirred for 5 minutes. Dichlorodiisopropylsilane (1.85 g, 10 mmol, TCI) was slowly added thereto, and then stirred at room temperature for 12 hours for reaction.

After completing the reaction, water (100 ml) was added to the resulting mixture to separate layers. The resultant was extracted with 100 ml of ethylacetate three times. The collected organic fraction was dried over $MgSO_4$, filtered, and then the solvent was removed by rotary evaporation. The resultant, from which the solvent was removed, was distilled under reduced pressure to give 2,2-diisopropyl-1,3,6,2-trioxasilocane (0.90 g, 4.12 mmol, 41% yield) as an organosilane compound of Formula 3. The prepared organosilane compound of Formula 3 was confirmed by nuclear magnetic resonance spectroscopy ($^1$H-NMR).

$^1$H-NMR: δ 3.87~3.85 (dt, 4H), 3.67~3.65 (dt, 4H), 1.14~1.06 (m, 2H), 1.04~1.02 (d, 12H)

(3) Propylene Polymerization

A reactor with a capacity of 2 L was dried under vacuum for 1 hour, and then sufficiently purged with nitrogen. 4.0 mmol of triethylaluminum, 0.4 mmol of 2,2-diisopropyl-1,3,6,2-trioxasilocane (DIPTOS) prepared in the step (2), and a slurry that was prepared by adding 4 ml of purified hexane to 10 mg of solid main catalyst (titanium content: 5.0 mmol) prepared in the step (1) were mixed and injected to the reactor at room temperature [ratio of silane and titanium in catalyst system (Si/Ti)=80]. Then, 3,300 ppm of hydrogen per mole of propylene was injected, and then 1.5 L of liquid propylene was injected. While stirring the mixture, the temperature was raised to 70° C., and a polymerization was performed for 1 hour. After completing the polymerization, the unreacted gas was removed, and the temperature was cooled to room temperature to complete the reaction. The produced polymer was isolated and collected, and then dried in a vacuum oven at 70° C. for 1 hour or more to give a white polypropylene. The polymerization results are summarized in the following Table 1.

Example 2

A polymerization was performed in the same manners as Example 1 to give a white polymer, except that upon propylene polymerization, 0.1 mmol of 2,2-diisopropyl-1,3,6,2-trioxasilocane (DIPTOS) prepared in the step (2) of Example 1 and 0.3 mmol of dicyclopentyldimethoxysilane (DCP-DMS) were added to the reactor as an external electron donor. The polymerization results are illustrated in the following Table 1.

Example 3

A polymerization was performed in the same manners as Example 1 to give a white polymer, except that upon propylene polymerization, 0.2 mmol of 2,2-diisopropyl-1,3,6,2-trioxasilocane (DIPTOS) prepared in the step (2) of Example 1 and 0.2 mmol of dicyclopentyldimethoxysilane (DCP-DMS) were added to the reactor as an external electron donor. The polymerization results are illustrated in the following Table 1.

Example 4

A polymerization was performed in the same manners as Example 1 to give a white polymer, except that upon propylene polymerization, 0.3 mmol of 2,2-diisopropyl-1,3,6,2-trioxasilocane (DIPTOS) prepared in the step (2) of Example 1 and 0.1 mmol of dicyclopentyldimethoxysilane (DCP-DMS) were added to the reactor as an external electron donor. The polymerization results are illustrated in the following Table 1.

Comparative Example 1

A polymerization was performed in the same manners as Example 1 to give a white polymer, except that upon propylene polymerization, an external electron donor was not used. The polymerization results are illustrated in the following Table 1.

Comparative Example 2

A polymerization was performed in the same manners as Example 1 to give a white polymer, except that upon propylene polymerization, 0.4 mmol of cyclohexylmethyldimethoxysilane (CHMDMS) was used as an external electron donor. The polymerization results are illustrated in the following Table 1.

Comparative Example 3

A polymerization was performed in the same manners as Example 1 to give a white polymer, except that upon propylene polymerization, 0.4 mmol of dicyclopentyldimethoxysilane (DCPDMS) was used as an external electron donor. The polymerization results are illustrated in the following Table 1.

Comparative Example 4

A polymerization was performed in the same manners as Example 1 to give a white polymer, except that upon propylene polymerization, 0.2 mmol of 2-cyclohexyl-2-methyl-1,3,6,2-trioxasilocane (CHMTOS) and 0.2 mmol of dicyclopentyldimethoxysilane (DCPDMS) were added to the reactor as an external electron donor. The polymerization results are illustrated in the following Table 1.

TABLE 1

| | Polymerization condition | | Polymerization result | | | | |
| --- | --- | --- | --- | --- | --- | --- | --- |
| | External electron donor | Si/Ti | Polymerization activity (kg PP/g catalyst) | MFR (g/10 min) | Isotacticity (%) | Apparent density (g/ml) | Molecular Weight Distribution (Mw/Mn) |
| Example 1 | DIPTOS | 80 | 13.8 | 57.5 | 81.1 | 0.35 | 6.94 |
| Example 2 | DIPTOS/DCPDMS = 1/3 | 80 | 30.5 | 2.3 | 98.5 | 0.43 | 6.72 |
| Example 3 | DIPTOS/DCPDMS = 1/1 | 80 | 34.1 | 2.2 | 98.4 | 0.42 | 6.22 |
| Example 4 | DIPTOS/DCPDMS = 3/1 | 80 | 38.1 | 2.5 | 98.2 | 0.42 | 7.24 |
| Comparative Example 1 | — | 80 | 21.8 | — | 59.1 | — | 5.71 |
| Comparative Example 2 | CHMDMS | 80 | 24.9 | 2.4 | 97.7 | 0.43 | 5.82 |
| Comparative Example 3 | DCPDMS | 80 | 27.6 | 1.1 | 98.9 | 0.43 | 6.53 |
| Comparative Example 4 | CHMTOS/DCPDMS = 1/1 | 80 | 25.4 | 3.0 | 98.4 | 0.40 | 6.63 |

\* Polymerization Condition: Injection amount of hydrogen (hydrogen/propylene: 3,300 ppm/mol), Reaction time (1 hr), Reaction temperature (70° C.),
DIPTOS: 2,2-diisopropyl-1,3,6,2-trioxasilocane,
CHMTOS: 2-cyclohexyl-2-methyl-1,3,6,2-trioxasilocane,
DCPDMS: dicyclopentyldimethoxysilane,
CHMDMS: cyclohexylmethyldimethoxysilane.

As shown in the results of Table 1, it can be seen that when 2,2-diisopropyl-1,3,6,2-trioxasilocane (DIPTOS) was used alone as an external electron donor upon propylene polymerization as in Example 1, a polypropylene having excellent melt-flow ability and better isotacticity than that of Comparative Example 1 can be produced. Further, it can be seen that when a mixture of 2,2-diisopropyl-1,3,6,2-trioxasilocane (DIPTOS) and dicyclopentyldimethoxysilane (DCPDMS) was used as an external electron donor upon propylene polymerization as in Examples 2, 3, and 4, a polypropylene having improved polymerization activity, melt-flow ability, and mold ability by wide molecular weight distribution can be produced, as compared to Comparative Example 2 or 3. In particular, when 2,2-diisopropyl-1,3,6,2-trioxasilocane (DIPTOS) and dicyclopentyldimethoxysilane (DCPDMS) were used in a ratio of 3:1 as an external electron donor upon propylene polymerization as in Example 4, a polypropylene had significantly improved polymerization activity and molecular weight distribution, and high melt-flow ability, as compared to Comparative Example 4, in which a mixture of 2-cyclohexyl-2-methyl-1,3,6,2-trioxasilocane (CHMTOS) and dicyclopentyldimethoxysilane (DCPDMS) was used, thereby producing a polypropylene having very excellent productivity and mold ability.

The invention claimed is:

1. A catalyst system for olefin polymerization, comprising
   (a) a transition metal compound containing an element of Groups IV, V or VI of the periodic table as a solid main catalyst component;
   (b) an organic metal compound containing an element of Group XIII of the periodic table as a cocatalyst component; and
   (c) an organosilane compound represented by the following Formula 1 as an external electron donor:

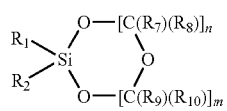

[Formula 1]

wherein $R_1$ and $R_2$ are each independently hydrogen, an alkyl group having 1 to 20 carbon atoms, an alkenyl group having 2 to 20 carbon atoms, an alkoxy group having 1 to 20 carbon atoms, or a cycloalkyl group having 5 to 30 carbon atoms, and at least one of $R_1$ and $R_2$ is a branched alkyl group having 1 to 20 carbon atoms;

$R_7$, $R_8$, $R_9$, and $R_{10}$ are each independently hydrogen, an alkyl group having 1 to 20 carbon atoms, an alkenyl group having 2 to 20 carbon atoms, an alkoxy group having 1 to 20 carbon atoms, or a cycloalkyl group having 5 to 30 carbon atoms; and n and m are each independently an integer of 1 to 3.

2. The catalyst system for olefin polymerization according to claim 1, further comprising an organosilane compound represented by Formula 2 as an external electron donor (c):

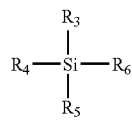

[Formula 2]

wherein $R_3$, $R_4$, $R_5$ and $R_6$ represent each independently hydrogen, an alkyl group having 1 to 20 carbon atoms, an alkenyl group having 2 to 20 carbon atoms, an alkoxy group having 1 to 20 carbon atoms, or a cycloalkyl group having 5 to 30 carbon atoms.

3. The catalyst system for olefin polymerization according to claim 1, wherein both $R_1$ and $R_2$ of the organosilane compound represented by Formula 1 are a branched alkyl group having 1 to 20 carbon atoms.

4. The catalyst system for olefin polymerization according to claim 1, wherein the organosilane compound represented by Formula 1 is an organosilane compound represented by the following Formula 3:

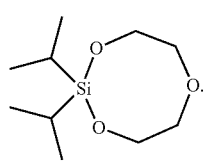

[Formula 3]

5. The catalyst system for olefin polymerization according to claim 2, wherein at least one of $R_3$, $R_4$, $R_5$ and $R_6$ in Formula 2 is an alkoxy group having 1 to 20 carbon atoms.

6. The catalyst system for olefin polymerization according to claim 2, wherein at least one of $R_3$, $R_4$, $R_5$ and $R_6$ in Formula 2 is a cycloalkyl group having 5 to 30 carbon atoms.

7. The catalyst system for olefin polymerization according to claim 2, wherein the organosilane compound represented by Formula 2 is an organosilane compound represented by the following Formula 4:

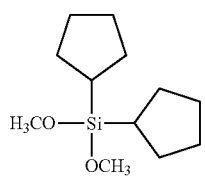

[Formula 4]

8. The catalyst system for olefin polymerization according to claim 2, wherein a molar ratio of the organosilane compound represented by Formula 2 to the organosilane compound represented by Formula 1 is 0.1 to 10.

9. The catalyst system for olefin polymerization according to claim 1, wherein the transition metal compound (a) is a solid titanium compound containing magnesium, titanium, halogen elements, and an internal electron donor.

10. The catalyst system for olefin polymerization according to claim 9, wherein the internal electron donor is a diether-based compound, a phthalate-based compound, or a mixture thereof.

11. The catalyst system for olefin polymerization according to claim 1, wherein the organic metal compound (b) is an organoaluminum compound.

12. The catalyst system for olefin polymerization according to claim 11, wherein the organic metal compound (b) is selected from the group consisting of trialkylaluminium, dialkylaluminiumhalide, alkylaluminiumdihalide, dialkylaluminiumhydride, alkylaluminium sesquihalide and mixtures thereof.

13. The catalyst system for olefin polymerization according to claim 12, wherein the organic metal compound (b) is selected from the group consisting of $Al(C_2H_5)_3$, $Al(C_2H_5)_2H$, $Al(C_3H_7)_3$, $Al(C_3H_7)_3$, $Al(C_3H_7)_2H$, $Al(C_4H_9)_2H$, $Al(i-C_4H_9)_2H$, $Al(i-C_4H_9)_3$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(C_{18}H_{37})_2$, $(i-C_4H_9)$, $C_2H_5)_2AlCl$, $(i-C_3H_9)_2AlCl$, $Al(C_{16}H_{33})_3$, $(C_2H_5)_3Al_2Cl_3$, and mixtures thereof.

14. The catalyst system for olefin polymerization according to claim 12, wherein the organic metal compound (b) is selected from the group consisting of a mixture of $Al(C_2H_5)_3$ and $Al(i-C_4H_9)_3$; a mixture of $Al(C_2H_5)_3$ and $Al(C_8H_{17})_3$; a mixture of $Al(C_4H_9)_2H$ and $Al(C_8H_{17})_3$; a mixture of $Al(i-C_4H_9)_3$ and $Al(C_8H_{17})_3$; a mixture of $Al(C_2H_5)_3$ and $Al(C_{12}H_{25})_3$; a mixture of $Al(i-C_4H_9)_3$ and $Al(C_{12}H_{25})_3$; a mixture of $Al(C_2H_5)_3$ and $Al(C_{16}H_{33})_3$; and a mixture of $Al(C_3H_7)_3$ and $Al(C_{18}H_{37})_2(i-C_4H_9)$.

15. The catalyst system for olefin polymerization according to claim 1, wherein a molar ratio of the organic metal compound (b) to the transition metal compound (a) is 5 to 800.

16. The catalyst system for olefin polymerization according to claim 1, wherein a molar ratio of the external electron donor (c) to the transition metal compound (a) is 1 to 150.

17. A method for olefin polymerization comprising using the catalyst system for olefin polymerization according to claim 1.

18. The method for olefin polymerization according to claim 17, wherein the olefin is an ethylene or alpha-olefin.

19. The method for olefin polymerization according to claim 17, wherein upon olefin polymerization, the feed rate of olefin into a reactor is 0.002 to 100 g of olefin/gram of catalyst for polymerization/hour.

* * * * *